Oct. 13, 1925.
Z. ROBINSON
SNUBBER FOR VEHICLES
Filed Aug. 18, 1924
1,556,717
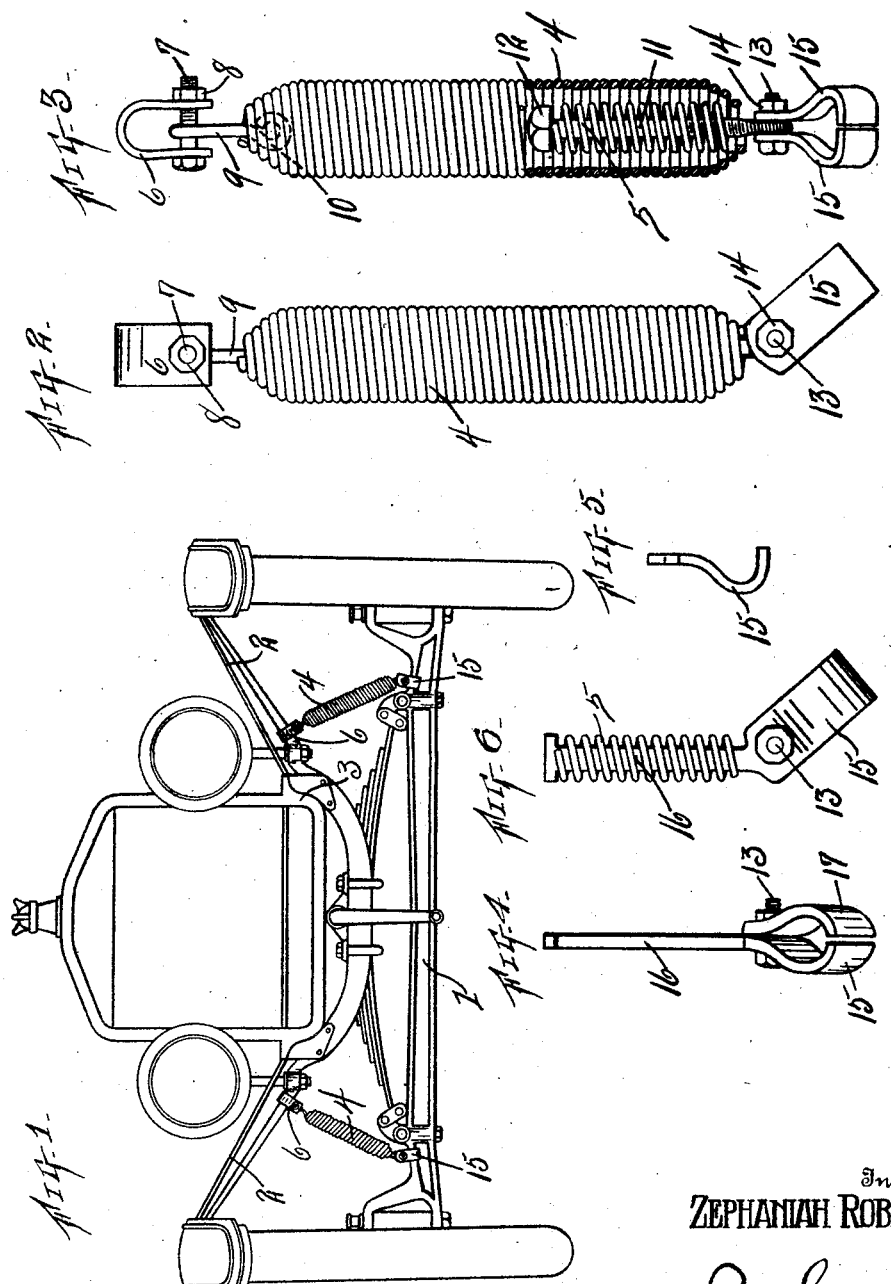
Inventor
ZEPHANIAH ROBINSON
By A. L. Jackson
Attorney

Patented Oct. 13, 1925.

1,556,717

UNITED STATES PATENT OFFICE.

ZEPHANIAH ROBINSON, OF MINERAL WELLS, TEXAS, ASSIGNOR TO STEER EZY SNUBBER COMPANY, OF DALLAS, TEXAS, A CORPORATION OF TEXAS.

SNUBBER FOR VEHICLES.

Application filed August 18, 1924. Serial No. 732,624.

*To all whom it may concern:*

Be it known that I, ZEPHANIAH ROBINSON, a citizen of the United States, residing at Mineral Wells, in the county of Palo Pinto and State of Texas, have invented certain new and useful Improvements in Snubbers for Vehicles, of which the following is a specification.

My invention relates to snubbers or shock-absorbers for vehicles; and the object is to provide efficient means for reducing or eliminating the rocking and rebounding of vehicles which are provided with springs. The advantage of such improvements is that the improvements can be supplied at small cost and the riding in vehicles is made more comfortable to the occupants. The devices are simple and durable and do not interfere with operation of the vehicles. Other objects and advantages will be fully explained in the following description and the invention will be more particularly pointed out in the claims.

Reference is had to the accompanying drawings which form a part of this application.

Fig. 1 is a front elevation of a vehicle equipped with the improved snubbers or shock-absorbers. Fig. 2 is an enlarged front elevation of one of the snubbers and the attaching devices. Fig. 3 is a side elevation of the same, partly in section. Fig. 4 is a front elevation of the inner member of the snubbing devices, showing a variation. Fig. 5 is an elevation of one member of the lower attaching clips. Fig. 6 is a side elevation of the device shown in Fig. 4.

Similar characters of reference are used to indicate the same part throughout the several views.

A vehicle is shown in the drawings provided with an axle 1 and fender braces 2 which are rigid with the body 3 of the vehicle. The shock-absorbers include an outer member 4 and an inner member 5. The spring 4 is the master spring and the inner spring 5 serves as an additional tension means. The spring 4 is connected to the fender brace rods 2 by means of a U-shaped clip 6 and a bolt 7 with nut 8 for connection with the fender brace rod and by a connecting bolt 9 which has an eye to receive the bolt 7 and a bead 10 formed thereon on which the spring 4 is hung. The bead 10 is formed by bending the bolt or connection 9. The bolt 7 projects longitudinally of the vehicle and the opening in the connection 9 must be facing the vehicle to make the device operate satisfactory.

An inner tension spring 5 is mounted in the lower end of spring 4 by means of a bolt 11 which has a head 12. The bolt 11 projects out of the spring 5 and is provided with an eye to receive a bolt 13 which is provided with a nut 14. The spring 4 is contracted at the lower end to form a seat for the spring 5. The spring 5 thus furnishes tension by reason of the seat provided by the spring 4 and by the bolt head 12. A clip 15 in two parts is provided to connect the bolt or tension rod 11 with the bolt 13. The clip 15 connects the snubber or shock-absorber to the axle of the vehicle. The clip members 15 engage under the upper flange of the axle 1.

In the variations in Figs. 4 and 5, the shank of the tension member 16 is extended to form one member of a clip to engage the upper flange of the axle and a clip member 17 co-operates with the shank member of tension rod 16 for attaching the snubbers to the axle.

In ordinary operations of driving on roads or streets that are only moderately rough, the inner spring 5 serves as a shock absorber for preventing the shaking or jolting of the occupants of the vehicle. When there is greater strain, the spring 4 will bear the load and so co-operate with the spring 5 and so snub the rebound of the vehicle.

What I claim, is,—

1. A snubber for vehicles comprising a master spring and a seat formed by said spring in the lower end thereof, means for connecting the said spring to a rigid portion of the vehicle body, tensioning means consisting of a headed tension rod within said spring and projecting from the lower end of said spring and a supplemental inner spring mounted on said tension rod between the head of said rod and said seat and supported by said seat, and means for connecting said tension rod to the axle of the vehicle.

2. In a vehicle provided with an axle and rigid fender braces; a snubber comprising a master spring and seats formed by said master spring in the upper and lower ends thereof, means for connecting said spring to said fender brace consisting of a clip, a connecting rod having a bolt hole in one end and a bead formed on the other end engaging the upper seat of said spring, and a bolt for connecting said clip and connecting rod, tension means mounted in the lower end of said spring engaging the adjacent seat of said spring and provided with a shank projecting through the lower end of said spring, and means for connecting said shank to the axle of the vehicle.

3. In a vehicle provided with an axle and rigid fender braces; a snubber comprising a master coiled spring having restricted portions at both ends forming seats, means for connecting said spring to a fender brace of the vehicle consisting of a clip engaging the fender brace and having openings for a bolt, a connecting rod having an eye for a bolt at one end and a bead at the other end enclosed within said spring and engaging the adjacent seat of said spring and a bolt connecting said clip to said connecting rod, tensioning means mounted in the other end of said spring and engaging the adjacent seat thereof and provided with a projecting shank, and a clip in two parts for connecting said shank to the axle of the vehicle.

4. In a vehicle provided with an axle and a rigid fender brace; a snubber comprising a master coiled spring having restricted portions at both ends forming seats, means for connecting said spring to a fender brace of the vehicle consisting of a connecting rod having a bead enclosed within said spring and engaging the seat in said spring adjacent thereto and a clip for connecting said rod to the vehicle fender brace, tensioning means mounted in the other end of said spring and engaging the adjacent seat thereof and provided with a shank projecting through the lower end of said spring, said tensioning means including a headed rod formed on the upper end of said shank and a supplemental spring mounted on said rod between the head thereof and the seat in the lower end of said master spring and supported by said seat, and a clip in two parts for connecting said shank to the axle of the vehicle.

In testimony whereof, I set my hand, this 9th day of August, 1924.

ZEPHANIAH ROBINSON.